United States Patent
Bishop et al.

(10) Patent No.: US 9,660,460 B2
(45) Date of Patent: May 23, 2017

(54) HYBRID BATTERY CONTROL

(71) Applicant: POWEROASIS LIMITED, Wiltshire (GB)

(72) Inventors: Peter William Dale Bishop, Swindon (GB); Paul Gillie, Royal Wootton Bassett (GB); Edward Christopher Oram, Bradford-on-Avon (GB)

(73) Assignee: Poweroasis Limited, Swindon, Wiltshire (GB)

( * ) Notice: Subject to any disclaimer, the term of this patent is extended or adjusted under 35 U.S.C. 154(b) by 79 days.

(21) Appl. No.: 14/398,706

(22) PCT Filed: May 3, 2013

(86) PCT No.: PCT/GB2013/051161
§ 371 (c)(1),
(2) Date: Nov. 3, 2014

(87) PCT Pub. No.: WO2013/164638
PCT Pub. Date: Nov. 7, 2013

(65) Prior Publication Data
US 2015/0097518 A1    Apr. 9, 2015

(30) Foreign Application Priority Data

May 3, 2012  (GB) .................................. 1207807.7

(51) Int. Cl.
*H02J 7/00*    (2006.01)
(52) U.S. Cl.
CPC ............ *H02J 7/0003* (2013.01); *H02J 7/007* (2013.01); *H02J 7/0052* (2013.01)

(58) Field of Classification Search
CPC .......... H02J 7/0003; H02J 7/0052; H02J 7/007
See application file for complete search history.

(56) References Cited

U.S. PATENT DOCUMENTS

| | | | |
|---|---|---|---|
| 5,565,756 A | 10/1996 | Urbish et al. | |
| 5,780,991 A | 7/1998 | Brake et al. | |
| 2010/0001689 A1 | 1/2010 | Hultman et al. | |
| 2010/0264874 A1 | 10/2010 | Murtha et al. | |
| 2011/0140675 A1 | 6/2011 | Yen | |
| 2011/0187312 A1* | 8/2011 | Yamamoto .......... | H01M 10/425 320/101 |

FOREIGN PATENT DOCUMENTS

| | | |
|---|---|---|
| EP | 100796 A2 | 5/2000 |
| GB | 1207807.7 | 9/2012 |
| WO | WO2009140560 A1 | 11/2009 |
| WO | PCTGB2013051161 | 10/2013 |
| WO | 2013164638 A2 | 11/2013 |

* cited by examiner

*Primary Examiner* — Vuthe Siek
(74) *Attorney, Agent, or Firm* — Gable Gotwals; David G. Woodral

(57) ABSTRACT

A hybrid battery controller controls charging of a hybrid battery comprising at least two types of rechargeable cell and includes battery characteristic logic operable to determine at least two optimized charge profiles corresponding to the at least two types of rechargeable cell; power source characteristic logic that assesses operational characteristics of a charging power source; and adaptation circuitry that adapts the operational characteristics of said charging power source to perform optimized charging of the at least two types of rechargeable cell according to said at least two determined optimized charge profiles.

15 Claims, 4 Drawing Sheets

Traditional UMTS Architecture

HYBRID BATTERY CONTROL

FIELD OF THE INVENTION

The present invention relates to a hybrid battery controller operable to control charging of a hybrid battery comprising at least two types of rechargeable cell, a method of controlling charging of a hybrid battery comprising at least two types of rechargeable cell and a computer program product operable to perform that method.

BACKGROUND

Wireless telecommunications systems are known. In those known systems radio coverage is provided to user equipment, for example, mobile telephones, by geographical area. A base station is located in each geographical area to provide the required radio coverage. User equipment in the area served by a base station receives information and data wirelessly from the base station and transmits information and data wirelessly to the base station. In a High Speed Downlink Packet Access telecommunications network, data and information is sent between user equipment and a base station in data packets on a radio frequency carrier.

Typically a base station in a communications network will be connected to a power grid such that service can be provided continuously. In remote sites, direct connection to a power grid may not be available and thus a base station may be powered by a diesel generator, fuel cell, and/or alternative energy sources, such as a photovoltaic array or wind turbine. In either case, a base station is also typically supplied with a battery based power source which can maintain electrical energy delivery to a base station load in the event that a primary power source, or power sources, fails or is temporarily unavailable. Provision of a reserve power supply in the form of a battery ensures that operation of a communications network may be maintained for a period in the event of a power failure. A back up battery may be operable to provide electrical energy to a base station load until a primary power source is re-established.

It is desired to provide an alternative implementation of a rechargeable battery for use in the event of loss or removal of a primary power source.

SUMMARY

Accordingly, a first aspect provides a hybrid battery controller operable to control charging of a hybrid battery comprising at least two types of rechargeable cell, the controller comprising: battery characteristic logic operable to determine an optimised charge profile for the at least two types of rechargeable cell; power source characteristic logic operable to assess operational characteristics of a charging power source; and adaptation circuitry operable to adapt the operational characteristics of the charging power source supplied to the at least two types of rechargeable cell to enable optimised charging of the at least two types of rechargeable cell.

Different types of rechargeable cell comprise cells may have different cell chemistries, material combinations or material compositions. That is to say, a hybrid battery may comprise cells which utilise at least two types of cell chemistry to provide electrical energy to a load, or at least two types of material combination, or at least two types of particular combination in different particular compositions.

Aspects described herein have particular applicability to a backup battery provided at a telecommunications base station, but it will be appreciated that aspects may also be applicable in other industrial scenarios in which a significant source of backup power is required in the event of primary power source failure, to provide an extended period of system operation in the event of such a primary power source failure. In one embodiment, the hybrid battery controller comprises a controller for a hybrid battery provided at a telecommunications site. It will be appreciated that alternative embodiments provide a hybrid battery for use in various industrial power back up scenarios, including, for example, back-up power in a field hospital, mining equipment or air traffic control deployment.

As explained above, telecommunication base station sites typically have battery systems installed to provide a reserve of power to sustain operation in the event of a grid power outage, for example a power cut. Those battery systems typically comprise a plurality of lead acid cells, maintained by the primary power source on a constant float charge. Maintained in such a manner, with occasional power outages, for example, a few times per year, lead acid cells typically have a life span of 10 years or more. However, if power outages are frequent, for example, several times a day, or the battery system is operated in conjunction with a generator in a hybrid cycling mode using available primary power sources, the battery system life time may be reduced to as little as a year or less.

Lead acid cells are a relatively cheap battery technology and thus provide a cost effective solution for providing back up or reserve capability at a site. However, since they can have a short life in cycling applications it is recognised that a hybrid battery which combines lead acid cells with cells of a type which can be frequently and deeply cycled whilst retaining longevity may provide a solution, by combining cell technologies into a single battery energy storage system. Combining cell technologies can allow primary advantages of each technology to be exploited, thus giving a cost effective solution for applications of a battery system requiring cycling capability and a reserve for occasional extended duration power outages. Combining, for example, lithium ion cells, which have a very high cycle life with lead acid cells which can provide a large static electrical energy reserve can provide a customised battery system solution for a base station application.

By selecting and combining cells with appropriate properties, a customised hybrid battery may be provided. However, the nature of discharge of such a hybrid system and the manner in which such a system in charged is problematic. It will, for example, be appreciated by those skilled in the art that if different cell technologies forming a hybrid battery system are simply connected together using a single DC bus then their voltage discharge to a load, would typically overlap in such a way that for the majority of a discharge period both batteries would discharge.

The first aspect recognises that the nature, for example, voltage, ac or dc, current, of a primary power source may be adapted by circuitry to allow batteries of different chemical types to be charged by one system. As a result, a hybrid battery may operate as if it is a single backup and not operate as two separate and distinct battery backup systems. That is to say, the interaction between the battery types provided to form a hybrid battery is considered and operation of a hybrid battery optimised, taking into account the properties of each of the component battery types.

According to one embodiment, the adaptation circuitry is operable to allow simultaneous optimised charging of the at least two types of rechargeable cell.

Accordingly, operation of the hybrid battery controller may allow both types of battery forming the hybrid battery to be simultaneously charged. State of charge of each of the rechargeable types of battery provided may be monitored according to some embodiments, and electrical energy provided preferentially to provide one of the at least two types of battery forming the hybrid battery to reach a full state of charge before another. Alternatively, a control unit operable to oversee operation of the hybrid battery controller may operate to ensure that each of the at least two types of battery forming the hybrid battery reach a full state of charge at substantially the same time. In each case the properties of the electrical energy provided to the at least two types of battery are adapted by suitable circuitry to meet the overarching requirement determined by the hybrid battery controller control unit.

According to one embodiment, the determined optimised charge profile comprises an optimised charge profile for each of the at least two types of rechargeable cell. In some embodiments, it may be possible to, for example, implement a charging regime which rapidly charges all available rechargeable batteries forming the hybrid battery, each battery type being charged optimally from a primary power source as if the other battery type was not present.

According to one embodiment, the determined optimised charge profile comprises an optimised charge profile for the hybrid battery comprising the at least two types of rechargeable cell, given configurable desired hybrid battery operation parameters. According to one embodiment, the configurable desired hybrid battery operation parameters comprise one or more of: hybrid battery lifespan; hybrid battery discharge time for a typical output load; or charging power source availability. Accordingly, the hybrid battery controller may operate according to a configurable algorithm, that algorithm being configurable to determine desired operation of a particular hybrid battery and application. It will be appreciated that various operational parameters of the hybrid battery, and/or operational parameters of the at least two types of rechargeable cell, may be monitored in order to meet a desired hybrid battery lifespan or battery discharge time, including, for example: battery or cell temperature, applied voltage, applied current, depth of discharge and other similar characteristics. Similarly, various parameters relating to charging power source availability may be monitored, including weather forecasts, planned power outage information and the like, this enabling a hybrid battery control unit to optimise operation of the hybrid battery in view of operational conditions. It will further be appreciated that although some monitoring may be required to occur at a hybrid battery site, overall control and monitoring may be carried out at a remote location.

According to one embodiment, the controller is operable to control discharge of the hybrid battery, and the battery characteristic logic is further operable to determine an optimised discharge profile for the at least two types of rechargeable cell, given an output load; and the adaptation circuitry is operable to adapt discharge characteristics of the hybrid battery to enable optimised discharge of the at least two types of rechargeable cell to the output load. Accordingly, if it is determined that one of the at least two types of battery forming the hybrid battery is chosen when designing the hybrid battery to tolerate relatively frequent cycling without a significant loss of overall battery life, the hybrid battery controller may be operable to discharge that type of battery before a battery which is less suited to any cycling, thereby optimising overall life of a particular arrangement of back up hybrid battery.

According to one embodiment, the power source characteristic logic is operable to disconnect the at least two types of rechargeable cell from the charging power source in the event that it is determined electrical energy available from the charging power source is substantially zero. Accordingly, if no power is available to recharge the batteries forming the hybrid battery, a connection to a primary power source can be broken.

According to one embodiment, the adaptation circuitry is operable to discharge electrical energy from one of the at least two types of rechargeable cell to the output load before another of the at least two types of rechargeable cell. Accordingly, the adaptation circuitry may allow full or partial discharge of one battery type to an output load before allowing any discharge of any other type of battery type.

According to one embodiment, the adaptation circuitry is operable to disconnect one of the at least two types of rechargeable cell from the output load to discharge electrical energy from one of the at least two types of rechargeable cell to the output load before another of the at least two types of rechargeable cell. Accordingly, in order to allow full or partial discharge of one type of battery before another, adaptation circuitry may be operable to restrict flow of electrical energy from a battery type by activating or deactivating or providing suitable diode or connections/disconnections in a coupling provided between a particular battery type and the load.

According to one embodiment, the adaptation circuitry is operable to reconnect the disconnected one of the at least two types of rechargeable cell to the output load to discharge electrical energy from both of the at least two types of rechargeable cell to the output load before another of the at least two types of rechargeable cell. Accordingly, electrical energy from more than one, or all battery types forming the hybrid battery, may be simultaneously supplied to the output load.

According to one embodiment, the at least two types of rechargeable cell comprise: cells of different chemistries. According to one embodiment, the at least two types of rechargeable cell comprise: at least one lithium ion based cell and at least one lead acid based cell. It will be appreciated that any suitable battery chemistries may be deployed to form a hybrid battery, for example, nickel-sodium, zinc-air and other appropriate cell chemistry combinations.

According to one embodiment, the adaptation circuitry is operable to cycle the at least one lithium ion cell, whilst simultaneously fully charging then maintaining the at least one lead acid based cell at a full state of charge at a float voltage. Accordingly, the lithium ion battery can be used to provide back-up power in the event of a short term loss of primary power source without detrimentally impacting the overall life of a hybrid battery.

A second aspect provides a method of controlling charging of a hybrid battery comprising at least two types of rechargeable cell, the method comprising:

determining an optimised charge profile for the at least two types of rechargeable cell;

assessing operational characteristics of a charging power source; and adapting the operational characteristics of the charging power source supplied to the at least two types of rechargeable cell, to enable simultaneous optimised charging of the at least two types of rechargeable cell.

According to one embodiment, the determined optimised charge profile comprises an optimised charge profile for each of the at least two types of rechargeable cell.

According to one embodiment, the determined optimised charge profile comprises an optimised charge profile for the hybrid battery comprising the at least two types of rechargeable cell, given configurable desired hybrid battery operation parameters.

According to one embodiment, the configurable desired hybrid battery operation parameters comprise one or more of: hybrid battery lifespan; hybrid battery discharge time for a typical output load; or charging power source availability.

According to one embodiment, the method further comprises controlling discharge of the hybrid battery, by determining an optimised discharge profile for the at least two types of rechargeable cell, given a output load; and adapting discharge characteristics of the hybrid battery to enable optimised discharge of the at least two types of rechargeable cell to the output load.

According to one embodiment, the method comprises: disconnecting the at least two types of rechargeable cell from the charging power source in the event that it is determined electrical energy available from the charging power source is substantially zero.

According to one embodiment, the method comprises discharging electrical energy from one of the at least two types of rechargeable cell to the output load before another of the at least two types of rechargeable cell.

According to one embodiment, the method comprises: disconnecting one of the at least two types of rechargeable cell from the output load to discharge electrical energy from one of the at least two types of rechargeable cell to the output load before another of the at least two types of rechargeable cell.

According to one embodiment, the method comprises reconnecting the disconnected one of the at least two types of rechargeable cell to the output load to discharge electrical energy from both of the at least two types of rechargeable cell to the output load before another of the at least two types of rechargeable cell.

According to one embodiment, the at least two types of rechargeable cell comprise: cells of different chemistries.

According to one embodiment, the at least two types of rechargeable cell comprise: at least one lithium ion based cell and at least one lead acid based cell.

According to one embodiment, the method comprises cycling the at least one lithium ion cell, whilst simultaneously fully charging then maintaining, the at least one lead acid based cell at a full state of charge at a float voltage.

A third aspect provides a computer program product operable, when executed on a computer to perform the method of the second aspect.

According some aspects and embodiments, the hybrid battery comprises a unitary battery. Accordingly, the hybrid battery may comprise a single unit, with a single charge connector or coupling and a single load discharge connector or coupling. In some embodiments, the hybrid battery has two terminals, used for both charging and discharging. Accordingly, the hybrid battery controller may be connectable or coupleable to said terminals.

According some aspects and embodiments, the hybrid battery controller is operable to charge the hybrid battery from a charging power source as if it were single battery.

According some aspects and embodiments, the hybrid battery controller is operable to discharge the hybrid battery to an output load as if it were single battery.

According some aspects and embodiments, the hybrid battery comprises at least two single-rechargeable-cell-type batteries having the same nominal voltage.

According some aspects and embodiments, the hybrid battery controller adaptation circuitry comprises switching circuitry operable to switch energy from the charging power source charge between the at least two single-rechargeable-cell-type batteries having the same nominal voltage to enable optimised charging of said hybrid battery.

According some aspects and embodiments, the hybrid battery controller adaptation circuitry comprises switching circuitry operable to switch energy delivered to a given output load from the at least two single-rechargeable-cell-type batteries having the same nominal voltage to enable optimised discharge of the hybrid battery.

Aspects and embodiments provide an apparatus and method which may allow effective charge and discharge of a hybrid battery which functions as a single or unitary battery, despite being formed from at least two types of rechargeable cell.

According to some embodiments, the hybrid battery controller is integrally formed with said hybrid battery. Accordingly, some aspects may provide a hybrid battery with in-built controller.

A further aspect provides a hybrid battery with an integral hybrid battery controller according to the first aspect.

Aspects and embodiments may comprise a substantially static industrial hybrid battery.

Such an industrial hybrid battery may comprise a hybrid battery which is operable to provide back-up power to machinery and components in the event of grid power failure. That grid power may comprise power from a mains, utility or commercial source. The power source may, in some embodiments, comprise a generator or fuel cell. Such a back-up power hybrid battery arrangement may be implemented, such that a hybrid battery is formed from an arrangement of at least two types of rechargeable cell.

Provision of a hybrid battery with in-built controller, or a substantially static industrial hybrid battery and controller, or any similar fixed combination of rechargeable cells may allow for appropriate selection of fixed or static adaptation circuitry selected in relation to the static arrangement of at least two types of rechargeable cell. That is to say, the adaptation circuitry need not be operable to dynamically adapt to a range of hybrid battery configurations. The adaptation circuitry may be selected to operate with a fixed or pre-selected hybrid battery configuration. In some embodiments, modification of operation of a hybrid battery controller may be implemented by modification to control software or set points or thresholds implemented by control software.

The hybrid battery may comprise a single load feed connector. The hybrid battery may comprise a single charge feed connector.

In particular, according to come embodiments, such a hybrid battery may comprise a single connector operable to allow charge of the hybrid battery. Furthermore, according to come embodiments, such a hybrid battery may comprise a single connector operable to allow discharge of the hybrid battery. According to some embodiments, switching circuitry may be provided, that switching circuitry may be operable to switch between the at least two types of rechargeable cell forming the hybrid battery during a hybrid battery charge phase. Similarly, according to some embodiments, switching circuitry may be provided, that switching circuitry may be operable to switch between the at least two types of rechargeable cell forming the hybrid battery during discharge of the hybrid battery. Provision of appropriate switching circuitry may allow for provision of a hybrid battery controller which allows for combination of at least two types of rechargeable cell without a need for active electronic devices. The switching circuitry need not operate fast and therefore may comprise relays, contactors and other similar devices. In particular, the switching circuitry may only need to operate at certain points in each charge and/or discharge cycle of the hybrid battery. Those points may be minutes or hours apart. Of course, transistors and similar active components may be used to support adaptation circuitry of a hybrid battery controller as appropriate. It will be appreciated that a switching arrangement may provide a controller which enables simple, cost effective implementation of a hybrid battery for industrial application.

According to some aspects and embodiments, the hybrid battery comprises at least two types of rechargeable cell, each of said types of rechargeable cell forming said hybrid battery are arranged to form a single-rechargeable-cell-type battery. Each single-rechargeable-cell-type battery forming said hybrid battery may have the same, or identical, nominal voltage. Each single-rechargeable-cell-type battery forming said hybrid battery may have the same polarity. The hybrid battery controller may operate, in an arrangement in which the single-rechargeable-cell-type batteries forming said hybrid battery have the same nominal voltage, to take account of different charge and/or discharge properties of the single-rechargeable-cell-type batteries forming a unitary hybrid battery. Those different charge and/or discharge properties result from, for example, the different cell chemistries of the at least two types of rechargeable cell.

Aspects and embodiments may provide a hybrid battery controller suited to a static industrial backup battery. According to some embodiments, the charging power source comprises grid power. Accordingly, the hybrid battery controller may be operable to adapt a substantially constant, uniform power supply to provide component cells forming a hybrid battery with energy in accordance with a charge profile chosen to optimise charging of the hybrid battery as a whole. The optimised charge and/or discharge profile of, for example, a hybrid battery formed from component cells is a compromise, based on individual charge profiles of those cells. The charge and/or discharge profile of the hybrid battery may be optimised, for example, to provide a minimised overall charge time for said hybrid battery, to provide a maximised hybrid battery lifetime in a particular deployment scenario, or to maintain a minimum hybrid battery runtime, given a likely hybrid battery load.

Further particular and preferred aspects are set out in the accompanying independent and dependent claims. Features of the dependent claims may be combined with the features of the independent claims as appropriate, and in combinations other than those explicitly set out in the claims.

BRIEF DESCRIPTION OF THE DRAWINGS

Embodiments of the present invention will now be described further with reference to the drawings, in which.

DESCRIPTION OF THE EMBODIMENTS

Figure 1:
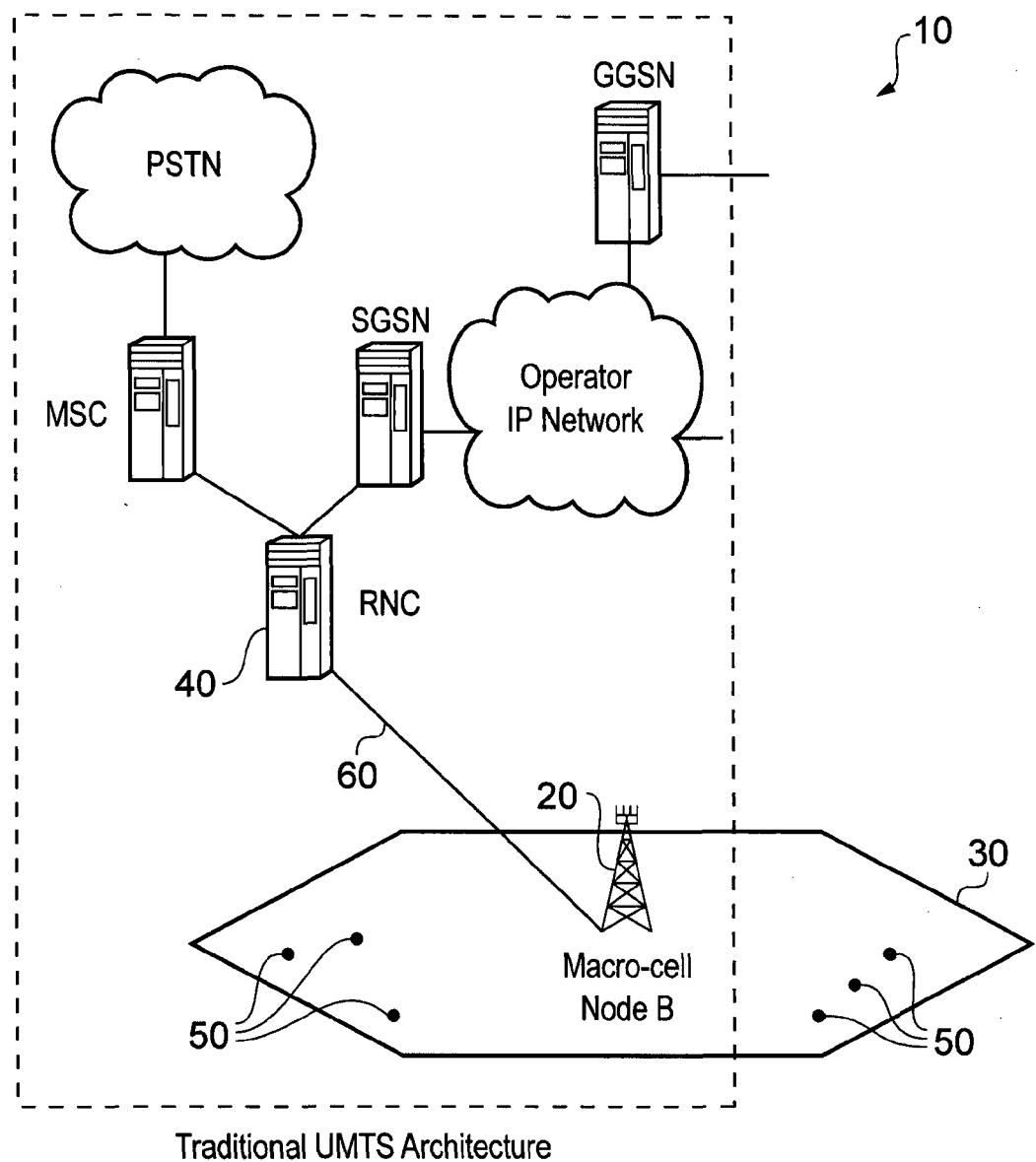
FIG. 1 illustrates the main components of a typical telecommunications network.

FIG. 1 illustrates generally a wireless telecommunications system 10. User equipment 50 roam through the wireless telecommunications system. Base stations are provided which support areas of radio coverage 30. A number of such base stations are provided and are distributed geographically in order to provide a wide area of coverage to user equipment 50. When user equipment are within an area served by a base station 30, communications may be established between the user equipment and the base station over associated wireless radio links. Each base station typically supports a number of sectors within the geographical area of service 30.

Typically, a different antenna within a base station supports each associated sector. Accordingly, each base station 20 has multiple antennas and signals sent through the different antennas are electronically weighted to provide a sectorised approached. Of course, it will be appreciated that FIG. 1 illustrates a small sub-set of the total number of user equipment and base stations that may be present in a typical communications system.

The wireless communications system shown in FIG. 1 is a typical 3G UMTS system and each base station (node B) is managed by a Radio Network Controller (RNC) 40. The RNC 40 controls operation of the wireless communications system by communicating with a plurality of base stations over a backhaul communications link 60. The network controller also communicates with user equipment 50 via each base station and thus effectively manages the entire wireless communications system.

Typically a base station in a communications network such as that shown in FIG. 1 will be connected to a power grid such that service can be provided continuously. In remote sites, direct connection to a power grid may not be available and thus a base station may be powered by a diesel generator and/or alternative energy sources, such as a photovoltaic array or wind turbine. In either case, a base station is also typically supplied with a battery based power source which can maintain electrical energy delivery to a base station load in the event that a primary power source, or power sources, fails. Provision of a reserve power supply in the form of a battery ensures that operation of a communications network may be maintained for a period in the event of a power failure. A back up battery may be operable to provide electrical energy to a base station load until a primary power source is re-established.

Aspects described herein have particular applicability to a backup battery provided at a telecommunications base station, but it will be appreciated that aspects may also be applicable in other industrial scenarios in which a significant source of backup power is required in the event of primary power source failure.

As explained above, telecommunication base station sites typically have battery systems installed to provide a reserve of power to sustain operation in the event of a grid power outage, for example a power cut. Those battery systems typically comprise a plurality of lead acid cells, maintained by the primary power source on a constant float charge. Maintained in such a manner, with occasional power outages, for example, a few times per year, lead acid cells typically have a life span of 10 years or more. However, if power outages are frequent, for example, several times a day, or the battery system is operated in conjunction with a generator in a hybrid cycling mode using available primary power sources, the battery system life time may be reduced to as little as a year or less.

Lead acid cells are a cheap battery technology and thus provide a cost effective solution for providing back up or reserve capability at a site. However, they do not respond well to cycling and it is recognised that a hybrid battery which combines lead acid cells with cells of a type which can be sensibly cycled whilst retaining longevity may provide a solution, by combining cell technologies into a single battery energy storage system. Combining cell technologies can allow primary advantages of each technology to be exploited, thus giving a cost effective solution for applications of a battery system requiring cycling capability and a reserve for occasional extended duration power outages. Combining, for example, lithium ion cells, which have a very high cycle life with lead acid cells which can provide a large static electrical energy reserve can provide a customised battery system solution for a base station application.

Figure 2:
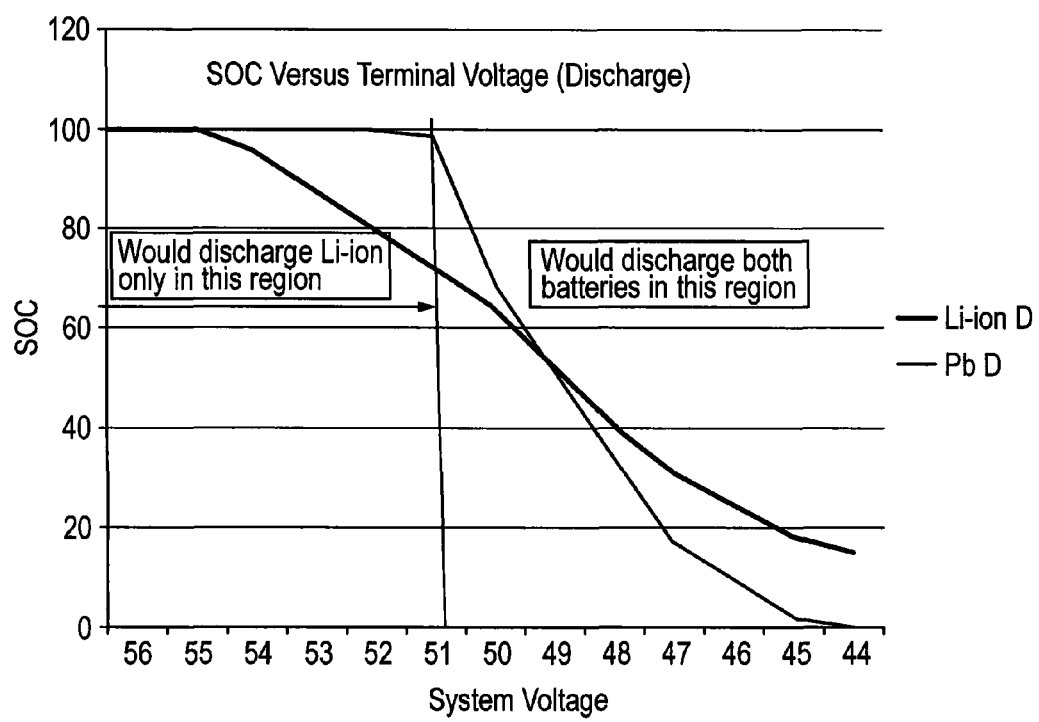
FIG. 2 illustrates a discharge curve of a lithium ion and a lead acid battery.

By selecting and combining cells with appropriate properties, a customised hybrid battery may be provided. However, the nature of discharge of such a hybrid system and the manner in which such a system in charged is problematic. It will, for example, be appreciated by those skilled in the art that if different cell technologies forming a hybrid battery system are simply connected together using a single DC bus then their voltage discharge to a load, would typically overlap in such a way that for the majority of a discharge period both batteries would discharge. Such a scenario is illustrated in FIG. 2, in which a state of charge (vertical axis) and battery system voltage (horizontal axis) available to a load for a system comprising lead acid cells (Pb D) and lithium ion cells (Li-ion D) is shown. Furthermore it will be appreciated that the "optimum" charging profile of energy supply from an available power source to each type of cell to provide a desired outcome, for example, extended cell life, or rapid reaching of a full state of charge, or similar desirable cell parameters may differ significantly depending upon cell type.

Aspects described herein allow combination of cell technologies to provide a hybrid battery system by providing a monitoring and control system to match a hybrid battery system, comprising cells of different technologies and having different charge and discharge voltage and current profiles, to available charging and discharging equipment.

Figure 3:
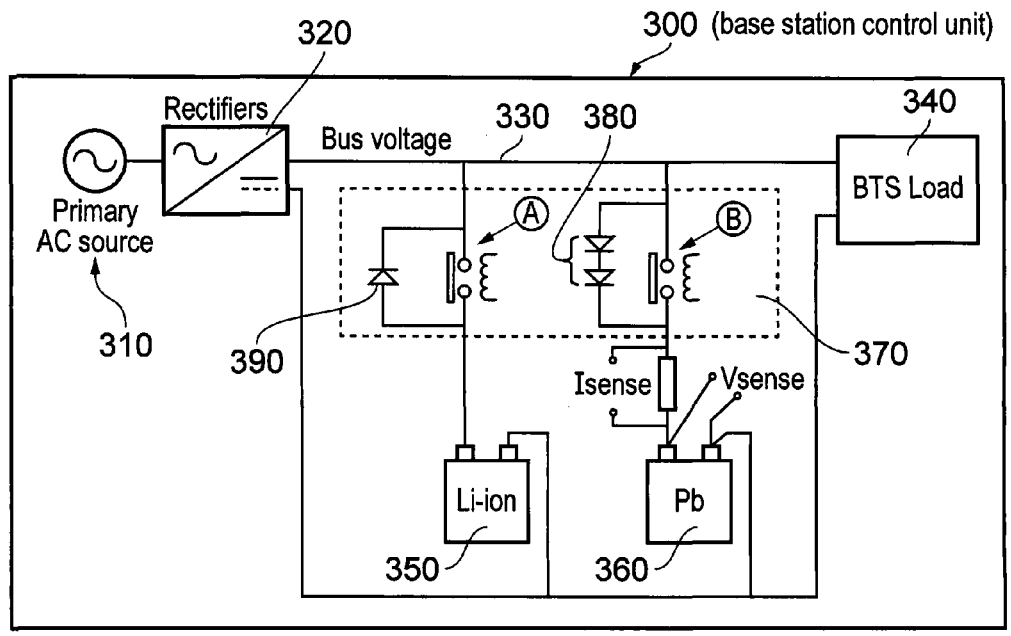
FIG. 3 illustrates schematically a controlled hybrid battery according to one embodiment.
Figure 4:
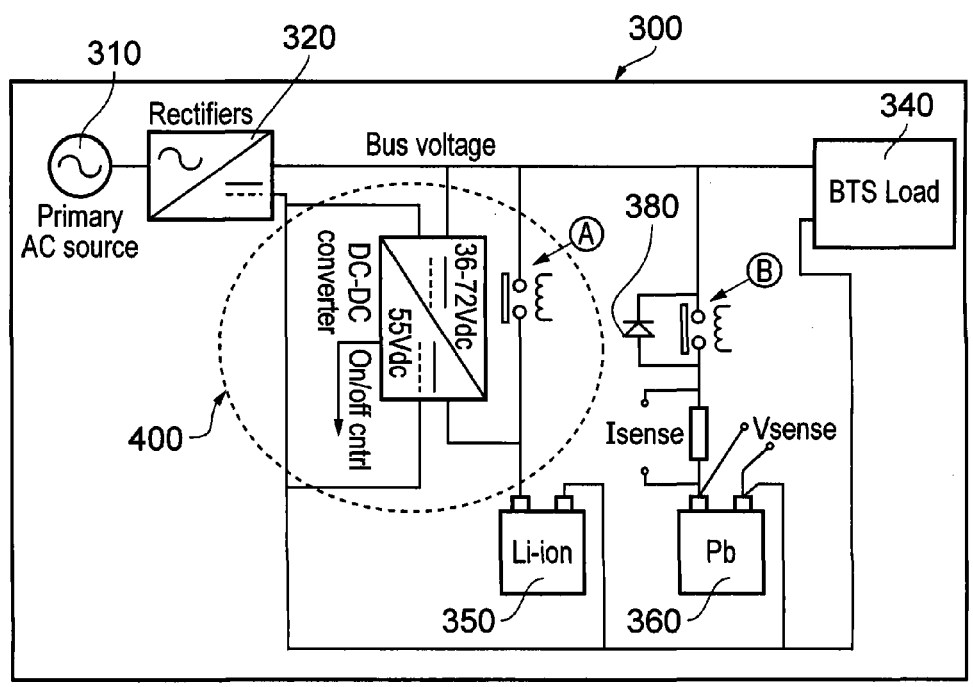
FIG. 4 illustrates schematically a controlled hybrid battery according to one embodiment.
Figure 5:
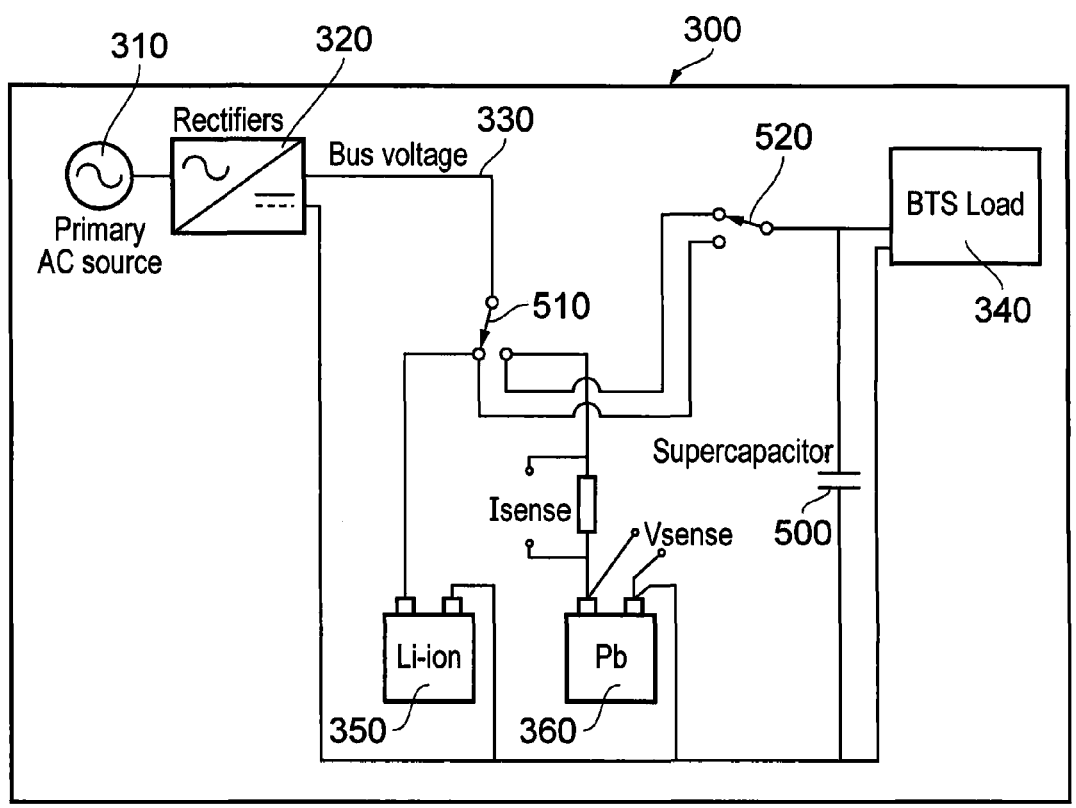
FIG. 5 illustrates schematically a controlled hybrid battery according to one embodiment.

The circuit diagrams of FIGS. 3 to 5 illustrate schematically system designs for the control of charging and discharging of mixed technology batteries. In these illustrative examples, a hybrid battery system comprises cells of lithium-ion and lead-acid technologies. Reference numerals have been re-used as appropriate throughout FIGS. 3 to 5, with a single reference numeral denoting the same feature throughout those Figures.

As illustrated schematically in FIG. 3, a base station control unit 300 is connected to a primary AC power source 310. AC power from that power source is supplied to appropriate rectifier circuitry 320 to provide a bus voltage 330. Various components of a base station may be coupled to the bus voltage 330 including, as shown in FIG. 3, a rechargeable hybrid battery comprising lithium ion cells 350 and lead acid cells 360. Adaptation circuitry 370 is provided between bus voltage 330 and the lithium ion and lead acid cells to adapt properties of the available charging system to suit charging properties determined for the lithium ion and lead acid cells and ensure the hybrid battery provided by the combination of those cells operates as intended.

Modes of operation of the base station control unit illustrated in FIG. 3 are now described in detail.

In order to charge both lithium ion and lead acid batteries from a low voltage disconnect, the unit 300 operates as follows: contactor A is moved to a closed position and contactor B is moved to a closed position. The primary AC source 310 is then operable, via rectifiers 320 and adaptation circuitry 370, to charge both battery technologies 350, 360 simultaneously.

According to the embodiment shown in FIG. 3, a charge control unit (not shown) is operable to limit charge current into each of the battery technologies based on the recommended charging profile of the Lithium-ion battery block. In the illustrated embodiment, the bus voltage continues to rise up to a voltage level of 56.0 Vdc which, in this embodiment, equates to 100% capacity State of Charge (SOC) on the Lithium Ion battery.

The charge control unit is then operable to ensure that bus voltage remains at 56 Vdc and monitors charge current into the lead-acid battery 360 at an Isense connection. When the charge control unit determines that charge current as measured at Isense is tapering off, and meets criteria set by an appropriate control algorithm, the charge control unit is operable to open contactor B.

In the embodiment shown in FIG. 3, the charge controller is then operable to regulate voltage across the lead acid battery 360 to an appropriate set float voltage. In this case, the float voltage is 54.9 Vdc, but it will be appreciated that the float voltage of a lead acid battery is typically dependent on manufacturer recommendations and temperature compensation factors.

The adaptation circuitry 370 includes two diodes in series 380 and thus the nominal bus voltage to maintain an appropriate float voltage in this case is approximately 54.9 Vdc plus 2× forward diode drops. In this case, the nominal bus voltage required for an appropriate float voltage is approximately 55.9 Vdc. Such a bus voltage allows the lithium-ion battery 350 to charge to greater than 95% capacity.

It will be appreciated that, according to alternative embodiments, the two diodes 380 shown in FIG. 3 could be replaced with a Buck or Linear regulator circuit to produce a more accurate bus voltage at 56 Vdc and maintain an independent temperature compensated float voltage at 54.9 VDC at the lead acid battery 360.

It will be appreciated that the specific voltage levels referred to throughout this document relate to particular implementations. In particular, the scenario described (that of a telecommunications base station) is such that 24 lead acid batteries are typically provided in series, to support a typical 48 v system. However, the principle of aspects described herein may be implemented with many different cell voltages and overall system voltages, including common examples, such as 24 v and 12 v systems.

In order to implement a charge-discharge cycle from a full state of charge of the hybrid battery comprising the two cell types, the following process may be implemented.

The arrangement of FIG. 3 is provided in an initial state in which contactor A is closed and contactor B is open. In the event that primary AC source 310 fails or in the event that supply from the source 310 is switched off in order to implement a predetermined charge discharge cycle, then the fully charged lithium ion battery 350 is initially operable to provide electrical energy to maintain load 340. The lithium ion battery in the embodiment shown starts to discharge linearly from 56 Vdc. If diodes 380 are fitted across contactor B as shown in FIG. 3, a small trickle charge will flow from the lithium-ion battery 350 to the lead acid battery 360. If a series regulator is fitted, the trickle charge current will flow for a limited period of time until there is insufficient voltage differential across the regulator.

In a micro-cycle scenario, according to which primary source 310 is unavailable for a period of short duration only, the lithium-ion battery 350 is chosen such that it is scaled to provide the energy required for typical operation of load 340 until such time that the AC primary source 310 is normally returned. In the illustrated embodiment, the operational range required from bus voltage is 56 Vdc to 52 Vdc, which in the embodiment illustrated equates to approximately 30 to 40% of available capacity of the lithium-ion battery 350.

Lithium-ion battery technology typically has a very high cycle life of greater than 7,000 cycles at 40% depth of discharge and beyond. Lead-acid battery technology typically lasts only approximately 1500 to 2000 cycles and thus provision of lithium ion technology for cycling scenarios can offer a significant advantage in relation to overall life of battery provided on a base station site.

During extended outages of the AC primary source 310, the charge and discharge controller (not shown in FIG. 3) is operable to allow lithium-ion battery 350 to initially continue to discharge, thus providing energy to the load. During the lithium-ion discharge period, lead acid battery 360 remains fully charged and provides standby autonomy since it is isolated from the bus voltage 330 via diodes 380 (or regulator in an alternative embodiment).

If the AC primary source 310 returns before lithium-ion battery 350 is fully depleted, then the charge controller is operable to ensure that electrical energy from the primary source is used to recharge the lithium-ion battery 350. It will thus be appreciated that in a micro-cycle case, the charge-discharge cycle implemented by the charge controller utilises stored electrical energy available from the lithium-ion battery, thus making use of the high cycle life of that battery technology, whilst maintaining a high level of long term autonomy in the capacity reserve of the lead acid batteries.

If the AC primary source does not return before a charge controller determines it is likely that the lithium-ion battery is fully depleted, the charge controller is operable, according to some embodiments, to implement the following sequence: prior to full depletion of the lithium battery capacity, contactor A is opened. Current will continue to flow from the Lithium-ion battery via diode 390 fitted in parallel with contactor A. Contactor B is then moved to a closed position and, in the embodiment shown, the lead acid batteries 360 are operable to supply energy to load 340 at 52 Vdc bus voltage. The function of diode 390 across contactor A is to prevent energy from the lead-acid battery flowing back into the lithium-ion battery. When AC primary source 310 returns, a decision can be made by the charge and discharge controller regarding which battery technology to prioritise in recharging.

FIG. 4 illustrates a base station control unit according to an alternative embodiment. In the embodiment of FIG. 4, the bus voltage 330 is maintained at an optimum charge control and voltage level for fast charging and float charging of the lead acid battery technology 360. The charging of the lithium-ion battery 350 is controlled by a separate power converter 400 operable, in the embodiment shown, to maintain 56 Vdc across the lithium-ion battery 350.

The separate power converter 400 provided to charge the lithium-ion battery 350 may take various forms. According to one embodiment, a DC/DC converter can be used to regulate the supply voltage and/or current to the lithium-ion battery 350. A parallel contactor A is required, as shown in FIG. 4, to allow flow of current from the lithium-ion battery during the discharge cycle. Alternatively, a bi-directional power supply could be implemented. This would negate the need for contactor A.

In the arrangement shown in FIG. 4, hybrid battery discharge occurs according to the following process: the system typically starts with contactor A in an open position and contactor B in a closed position, and if a primary power source fails or is switched off, the lead acid battery is operable to provide energy to the load. The hybrid battery controller is operable to open contactor B and the load is then supported via current flowing through the diode across contactor B. The controller is then operable to close contactor A and the load is supported by the lithium-ion battery due to its higher terminal voltage. The diode arranged across contactor B prevents energy flowing from the lithium-ion battery into the lead acid battery.

FIG. 5 illustrates schematically a base station control unit according to a further embodiment. According to the embodiment shown in FIG. 5, two transfer switches 510, 520 are used to independently configure which battery technology 350, 360 is connected to the system bus voltage 330 and which battery technology 350, 360 is connected to the system load 340.

The arrangement of FIG. 5 offers a solution whereby the primary power source can be used to power the load and charge each battery technology. The position of the transfer switch connecting the bus voltage 330 to the batteries 350, 360 needs to be known, such that the appropriate voltage and or charge control set points are updated into the rectifier system and the charge regime is optimised for the particular battery technology connected at that time. A super-capacitor 500 is used to smooth out the transition switching of transfer switch 520.

It will be appreciated that a person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its scope as defined by the claims. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A hybrid battery controller operable to control charging of a hybrid battery comprising at least two types of rechargeable cell, said controller comprising:
    battery characteristic logic that determines at least two optimised charge profiles corresponding to said at least two types of rechargeable cell;
    power source characteristic logic that assesses operational characteristics of a charging power source; and
    adaptation circuitry that adapts said operational characteristics of said charging power source to perform optimised charging of said at least two types of rechargeable cell according to said at least two determined optimised charge profiles;
    wherein said at least two determined optimised charge profiles each include at least a voltage profile or a current profile;
    wherein said at least two types of rechargeable cell comprise: cells of different chemistries;
    wherein said at least two types of rechargeable cell comprise: at least one lithium ion based cell and at least one lead acid based cell; and
    wherein said adaptation circuitry is operable to cycle said at least one lithium ion cell, whilst simultaneously fully charging then maintaining said at least one lead acid based cell at a full state of charge at a float voltage.

2. A hybrid battery controller according to claim 1, wherein said determined optimised charge profile comprises an optimised charge profile for each of said at least two types of rechargeable cell.

3. A hybrid battery controller according to claim 1, wherein said determined optimised charge profile comprises an optimised charge profile for said hybrid battery comprising said at least two types of rechargeable cell, given configurable desired hybrid battery operation parameters.

4. A hybrid battery controller according to claim 3, wherein said configurable desired hybrid battery operation parameters comprise one or more of: hybrid battery lifespan; hybrid battery discharge time for an output load; or charging power source availability.

5. A hybrid battery controller according to claim 1, in which said hybrid battery comprises a single unit.

6. A hybrid battery controller according claim 1, wherein the adaptation circuitry charges said hybrid battery from a charging power source as if it were single battery.

7. A hybrid battery controller according to claim 1, wherein the adaptation circuitry discharges said hybrid battery to an output load as if it were single battery.

8. A hybrid battery controller according to claim 1, integrally formed with said hybrid battery.

9. A hybrid battery controller operable to control charging of a hybrid battery comprising at least two types of rechargeable cell, said controller comprising:
    battery characteristic logic that determines at least two optimised charge profiles corresponding to said at least two types of rechargeable cell, said optimised charges profiles each having at least a voltage profile or a current profile;
    power source characteristic logic that assesses operational characteristics of a charging power source; and
    adaptation circuitry that adapts said operational characteristics of said charging power source to perform optimised charging of said at least two types of rechargeable cell according to said at least two determined optimised charge profiles;
    wherein said adaptation circuitry provides simultaneous optimised charging of said at least two types of rechargeable cell; and
    wherein said hybrid battery comprises at least two single-rechargeable-cell-type batteries having the same nominal voltage.

10. A hybrid battery controller operable to control charging of a hybrid battery comprising at least two types of rechargeable cell, said controller comprising:
    battery characteristic logic that determines at least two optimised charge profiles corresponding to said at least two types of rechargeable cell, the at least two optimised charge profiles each having at least a voltage profile or a current profile;
    power source characteristic logic that assesses operational characteristics of a charging power source; and
    adaptation circuitry that adapts said operational characteristics of said charging power source to perform optimised charging of said at least two types of rechargeable cell according to said at least two determined optimised charge profiles;
    wherein said controller controls discharge of said hybrid battery, said battery characteristic logic further determines an optimised discharge profile for said at least two types of rechargeable cell, given an output load, and said adaptation circuitry adapts discharge characteristics of said hybrid battery to enable optimised discharge of said at least two types of rechargeable cell to said output load;
    wherein said adaptation circuitry disconnects one of said at least two types of rechargeable cell from said output load to discharge electrical energy from one of said at least two types of rechargeable cell to said output load before another of said at least two types of rechargeable cell; and
    wherein said adaptation circuitry reconnects said disconnected one of said at least two types of rechargeable cell to said output load to discharge electrical energy from both of said at least two types of rechargeable cell to said output load before another of said at least two types of rechargeable cell.

11. A hybrid battery controller according to claim 10, wherein said adaptation circuitry is operable to discharges electrical energy from one of said at least two types of rechargeable cell to said output load before another of said at least two types of rechargeable cell.

12. A hybrid battery controller operable to control charging of a hybrid battery comprising at least two types of rechargeable cell, said controller comprising:
   battery characteristic logic that determines at least two optimised charge profiles corresponding to said at least two types of rechargeable cell, the at least two optimised charge profiles including at least a voltage profile or a current profile;
   power source characteristic logic that assesses operational characteristics of a charging power source; and
   adaptation circuitry that adapts said operational characteristics of said charging power source to perform optimised charging of said at least two types of rechargeable cell according to said at least two determined optimised charge profiles;
   wherein said hybrid battery comprises at least two single-rechargeable-cell-type batteries having the same nominal voltage.

13. A hybrid battery controller according to claim 12, wherein said adaptation circuitry comprises switching circuitry that switches energy from said charging power source charge between said at least two single-rechargeable-cell-type batteries having identical nominal voltage to enable optimised charging of said hybrid battery.

14. A hybrid battery controller according to claim 12, wherein said adaptation circuitry comprises switching circuitry that switches energy delivered to a given output load from said at least two single-rechargeable-cell-type batteries having identical nominal voltage to enable optimised discharge of said hybrid battery.

15. A method of controlling charging of a hybrid battery comprising at least two types of rechargeable cell, said method comprising:
   an using battery characteristic logic to determine at least two optimised charge profiles corresponding to said at least two types of rechargeable cell, the at least two optimised charge profiles having at least a voltage profile or a current profile;
   using power source characteristic logic to assess operational characteristics of a charging power source; and
   adapting using adaption circuitry to adapt said operational characteristics of said charging power source to perform optimised charging of said at least two types of rechargeable cell according to said at least two determined optimised charge profiles;
   wherein said at least two types of rechargeable cell comprise: cells of different chemistries;
   wherein said at least two types of rechargeable cell comprise: at least one lithium ion based cell and at least one lead acid based cell; and
   wherein said adaptation circuitry is operable to cycle said at least one lithium ion cell, whilst simultaneously fully charging then maintaining said at least one lead acid based cell at a full state of charge at a float voltage.

* * * * *